United States Patent [19]

Kinoshita et al.

[11] Patent Number: 5,372,227
[45] Date of Patent: Dec. 13, 1994

[54] ONE-WAY CLUTCH

[75] Inventors: Yoshio Kinoshita; Atsushi Sagae, both of Shizuoka, Japan

[73] Assignee: NSK-Warner K.K., Tokyo, Japan

[21] Appl. No.: 4,050

[22] Filed: Jan. 15, 1993

[30] Foreign Application Priority Data

Jan. 20, 1992 [JP] Japan .................. 4-001403[U]

[51] Int. Cl.$^5$ ............................................ F16D 41/06
[52] U.S. Cl. .................................... 192/45; 192/41 R
[58] Field of Search .................... 192/45, 41 R, 113 B

[56] References Cited

U.S. PATENT DOCUMENTS

| | | | |
|---|---|---|---|
| 2,505,794 | 5/1950 | Schofield | 192/45 |
| 4,088,211 | 5/1978 | Doller et al. | 192/45 |
| 4,106,602 | 8/1978 | Dieckermann | 192/45 |
| 4,185,724 | 1/1980 | Kitchin | 192/45 |
| 4,838,398 | 6/1989 | Lederman | 192/45 |
| 5,135,085 | 8/1992 | Kinoshita et al. | 192/41 R |
| 5,183,139 | 2/1993 | Malecha | 192/45 |
| 5,186,296 | 2/1993 | Kinoshita et al. | 192/41 R |

FOREIGN PATENT DOCUMENTS 62-42183 10/1987 Japan .

Primary Examiner—Rodney H. Bonck
Attorney, Agent, or Firm—Wegner, Cantor, Mueller & Player

[57] ABSTRACT

A one-way clutch is constructed of an inner member, an outer ring disposed coaxially with the inner member, clutch members arranged between the inner member and the outer ring to permit rotation of one of the inner member and the outer ring in one direction relative to the other but to restrict rotation of said one of the inner member and the outer ring in an opposite direction relative to the other, centering blocks arranged between the inner member and the outer ring, and a cage having support elements for the respective centering blocks. Each of the centering blocks is in the form of a hollow body having a sliding portion and a fixed portion. The sliding portion is maintained in sliding contact with one of the inner member and the outer ring, while the fixed portion is secured on the other one of the inner member and the outer ring.

8 Claims, 5 Drawing Sheets

ONE-WAY CLUTCH

BACKGROUND OF THE INVENTION

1. Field of the Invention

This invention relates to a pad bearing, in other words, a centering block, which is a slide bearing for a one-way clutch employed for operations such as torque transmission, backing-off and overrunning in an automatic transmission for an automotive vehicle, and especially to a centering block capable of guiding a lubricating oil to clutch members such as sprags or rollers.

2. Description of the Related Art

A conventional one-way clutch is illustrated in FIG. 12 through FIG. 16, in which FIG. 12 is a simplified schematic front view of the conventional one-way clutch, FIG. 13 is an enlarged fragmentary front view of the conventional one-way clutch, FIG. 14 is a front view of a centering block in the conventional one-way clutch, FIG. 15 is a fragmentary front view of a cage in the conventional one-way clutch, and FIG. 16 is a plan view of bent pieces of the cage in the conventional one-way clutch as viewed in the direction of arrow A in FIG. 15.

In FIG. 13, the conventional one-way clutch comprises an inner member 30 and an outer ring 1. Arranged between the inner member 30 and the outer ring 1 are rollers 2. Cam surfaces 1a are formed on an inner peripheral wall of the outer ring 1, whereby a cam mechanism is constructed of the rollers 2 and the corresponding cam surfaces 1a to allow the inner member 30 to rotate only in one direction relative to the outer ring 1. Namely, the inner member 30 is allowed to idle in a direction indicated by arrow B in FIG. 13 relative to the outer ring 1. On one side of the outer ring 1, a cage 3 is arranged coaxially with the outer ring 1. The cage 3 covers one end faces of the individual rollers 2. Parts of the cage 3 are bent to form bent pieces 3a, which extend between the inner member 30 and the outer ring 1. Tips 3b of the bent pieces 3a project out beyond an opposite side of the outer ring 1. On the opposite side of the outer ring 1, a side plate 4 is disposed covering opposite end faces of the rollers 2. The side plate 4 defines small holes 4a, through which the bent pieces 3a of the cage 3 extend. The tips 3b are crimped on an outer surface of the side plate 4 so that the side plate 4 is disposed coaxially with the outer ring 1 and the inner member 30 and the cage 3 and the side plate 4 are fixed on the outer ring 1.

Between the outer ring 1 and the inner member 30, centering blocks 5 are disposed. Each centering block 5 is composed of a sliding portion 5a, bent portions 5b, and support portions 5c connecting the sliding portion 5a and the individual bent portions 5b, respectively. The sliding portion 5a is maintained in sliding contact with the inner member 30, while the bent portions 5b are maintained in engagement with a corresponding recess 1b formed in an inner peripheral wall of the outer ring 1 and supported by the corresponding bent pieces 3a. The centering block 5 is hence fixed in the corresponding recess 1b of the outer ring 1 with the bent portions 5b being supported on the corresponding bent pieces 3a. The cage 3 is provided with L-shaped spring brackets 11 supporting thereon springs 10, respectively. Each spring 10 urges the associated roller 2 against the corresponding cam surface 1a. The bent pieces 3a also serve as stoppers for preventing rotation of the cage 3 against urging forces of the springs 10. Each support portion 5c is provided with a lubricating oil hole 5d through which a lubricating oil is allowed to flow.

Although not shown in the drawings, lubricating oil feed channels extend radially through the inner member 30 from its inner peripheral wall to its outer peripheral wall. The lubricating oil can therefore be fed under centrifugal force to the rollers 2 through the lubricating oil feed channels. Alternatively, the lubricating oil can be fed into a closed structure with the respective centering blocks 5 from an unillustrated lubricator and then to the rollers 2 through the lubricating oil holes 5d of the centering blocks 5.

Accordingly, the lubricating oil inside the one-way clutch can flow through the lubricating oil holes 5d, namely, can recirculate inside the one-way clutch without being blocked by the centering blocks 5.

Conventional centering blocks are however formed by pressing a metal sheet, so that they have a uniform wall thickness and an open shape. They are hence accompanied by the drawback that they are prone to deformation when subjected to a radial load and they are not resistant to vibrations applied from an associated outer ring.

SUMMARY OF THE INVENTION

An object of the present invention is to overcome various problems of such conventional centering blocks, which problems are all associated to insufficient strength. As a result of an extensive investigation, it has now been found that the above object can be achieved by increasing the wall thickness of each centering block at portions where higher strength is required and further by forming the centering block into a hollow shape to overcome the conventional tendency of deformation due to such an open structure. Use of a sintered alloy for the centering block has also been found advantageous.

In one aspect of the present invention, there is thus provided a one-way clutch constructed of an inner member, an outer ring disposed coaxially with the inner member, clutch members arranged between the inner member and the outer ring to permit rotation of one of the inner member and the outer ring in one direction relative to the other but to restrict rotation of said one of the inner member and the outer ring in an opposite direction relative to the other, centering blocks arranged between the inner member and the outer ring, and a cage having support elements for the respective centering blocks. Each of the centering blocks is in the form of a hollow body having a sliding portion and a fixed portion. The sliding portion is maintained in sliding contact with one of the inner member and the outer ring, while the fixed portion is secured on the other one of the inner member and the outer ring. Preferably, each centering block can be made of a sintered alloy.

Owing to the formation of each centering block into the shape of the a hollow block, the centering blocks in the one-way clutch according to this invention have the reinforced structure and are more resistant to deformation when a radial load is applied.

The above construction allows to increase the width of each support element of the cage. This makes it possible to reduce deformation of the supports, thereby providing a more rigid and durable support for the centering blocks. In addition, use of a sintered alloy allows to increase the wall thickness of each centering block greater at portions where higher strength is required.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
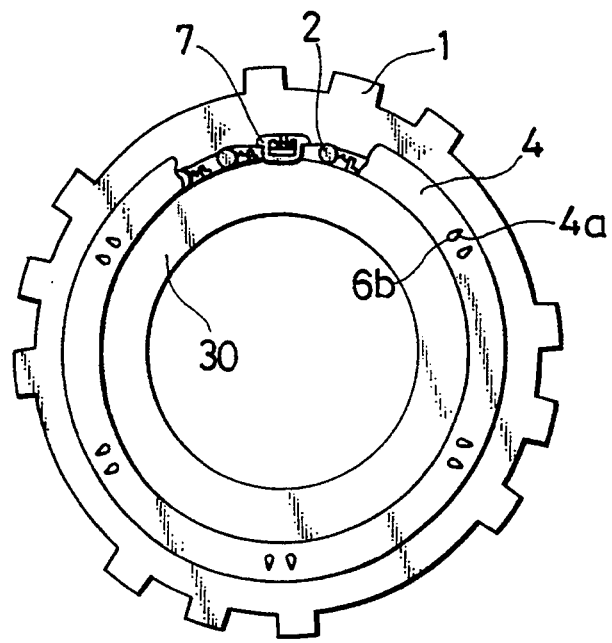
FIG. 1 is a simplified schematic front view of a one-way clutch according to a first embodiment of the present invention.

Referring first to FIGS. 1 through 6, the one-way clutch according to the first embodiment of the present invention will be described. As is illustrated in detail in FIG. 2, the one-way clutch comprises an inner member 30 and an outer ring 1. Between the inner member 30 and the outer ring 1, rollers 2 are arranged. Cam surfaces 1a are formed on an inner peripheral wall of the outer ring 1, whereby a cam mechanism is constructed of the rollers 2 and the corresponding cam surfaces 1a, both serving as clutch members, to allow the inner member 30 to rotate only in one direction relative to the outer ring 1. Namely, the inner member 30 is allowed to idle in a direction indicated by arrow D in FIG. 2 relative to the outer ring 1.

On one side of the outer ring 1, a cage 6 is arranged coaxially with the outer ring 1. The cage 6 covers one end faces of the individual rollers 2. Parts of the cage 6 are bent to form bent pieces 6a, which extend as support elements between the inner member 30 and the outer ring 1. Two tips 6b of each bent piece 6a project out beyond an opposite side of the outer ring 1.

On the opposite side of the outer ring 1, a side plate 4 is disposed covering opposite end faces of the rollers 2. The side plate 4 defines small holes 4a, through which the tips 6b of the bent pieces 6a of the cage 6 extend. The tips 6b are crimped on an outer surface of the side plate 4 so that the side plate 4 is disposed coaxially with the outer ring 1 and the inner member 30 and the cage 6 and the side plate 4 are fixed on the outer ring 1.

Figure 2:
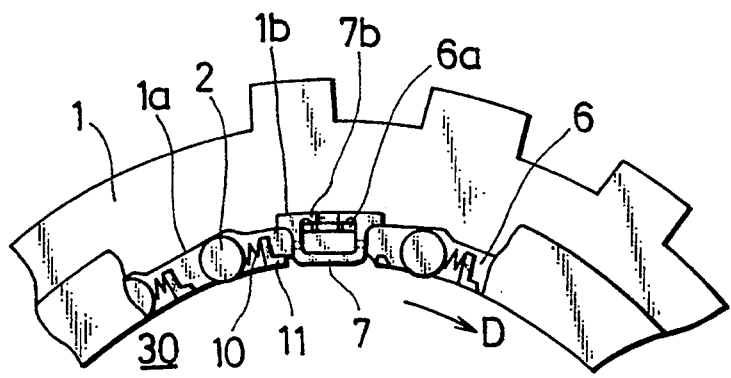
FIG. 2 is an enlarged fragmentary front view of the one-way clutch of FIG. 1.
Figure 3:
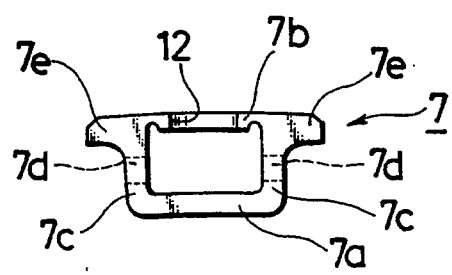
FIG. 3 is a front view of a centering block in the one-way clutch of FIG. 1.
Figure 4:
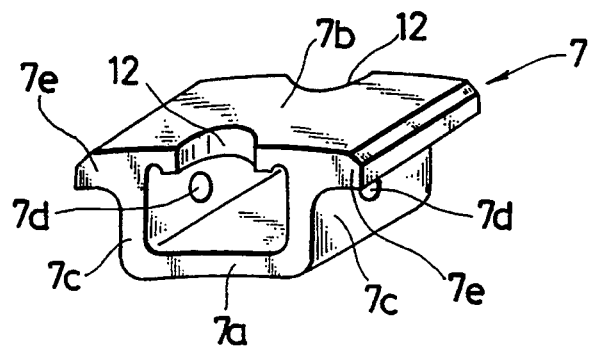
FIG. 4 is a perspective view of the centering block of FIG. 3.
Figure 5:
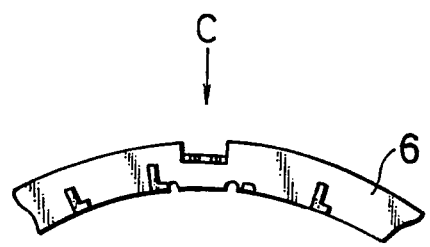
FIG. 5 is a front view of a cage in the one-way clutch of FIG. 1.
Figure 6:
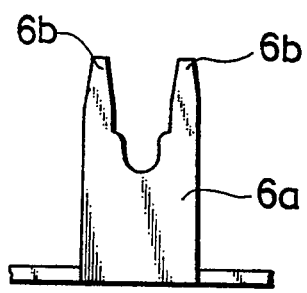
FIG. 6 is a plan view of a bent piece of the cage of FIG. 5 as viewed in the direction indicated by arrow C in FIG. 5.

Between the outer ring 1 and the inner member 30, centering blocks 7 are disposed. The front view and perspective view of each centering block 7 are shown in FIGS. 3 and 4, respectively, while the centering block 7 as assembled in the one-way clutch is shown in FIG. 2. The centering block 7 is in the form of a hollow body which is closed on four sides, being composed of a sliding portion 7a, a fixed portion 7b, and support portions 7c connecting the sliding portion 7a and the fixed portion 7b together. The sliding portion 7a is maintained in sliding contact with the inner member 30, while the fixed portion 7b is maintained in engagement with a corresponding recess 1b formed in an inner peripheral wall of the outer ring 1 and supported by the corresponding bent piece 6a. The centering block 7 is hence fixed in the corresponding recess 1b of the outer ring 1 with the bent portion 7b being supported on the corresponding bent piece 6a. Each support portion 7c is provided with a lubricating oil hole 7d. Further, the fixed portion 7b is provided with notches 12 as oil relief openings so that a lubricating oil fed through the side plate 4 is allowed to smoothly flow into the centering block 7. In addition, the fixed portion 7b has flange portions 7e at opposite angular ends thereof to ensure the engagement of the fixed portion 7b with the corresponding recess 1b formed in the inner peripheral wall of the outer ring 1.

As is depicted in FIG. 2, the centering block 7 is fixed in the corresponding recess 1b of the outer ring 1 with its fixed portion 7b supported on the corresponding bent piece 6a. The cage 6 is provided with L-shaped spring brackets 11 supporting thereon springs 10, respectively. Each spring 10 urges the associated roller 2 against the corresponding cam surface 1a. The bent pieces 6a also serve as stoppers for preventing rotation of the cage 6 against urging forces of the springs 10.

Although not shown in the drawings, lubricating oil feed channels extend radially through the inner member 30 from its inner peripheral wall to its outer peripheral wall. The lubricating oil can therefore be fed under centrifugal force to the rollers 2 through the lubricating oil feed channels. Alternatively, the lubricating oil can be fed into the respective centering blocks 7 from an unillustrated lubricator and then to the rollers 2 through the lubricating oil holes 7d of the centering blocks 7.

Accordingly, the lubricating oil inside the one-way clutch can flow through the lubricating oil holes 7d, namely, can recirculate inside the one-way clutch without being blocked by the centering blocks 7.

Since each centering block 7 is the hollow body, the fixed portion 7b including the flange portions 7e is continuous in the angular direction and, therefore, is durable against radial loads.

FIGS. 7 through 11 illustrate the centering blocks in the one-way clutches according to the second to sixth embodiments of the present invention.

Figure 7:
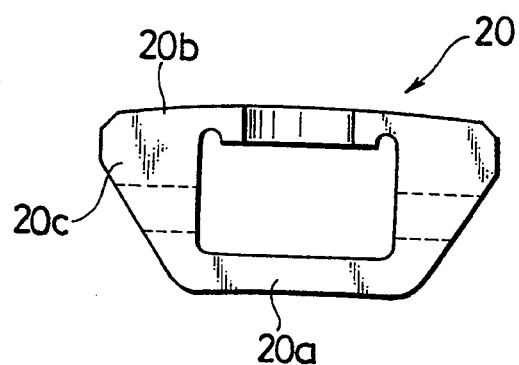
FIG. 7 is a front view of a centering block in a one-way clutch according to a second embodiment of the present invention, in which the centering block has an increased wall thickness.
Figure 8:
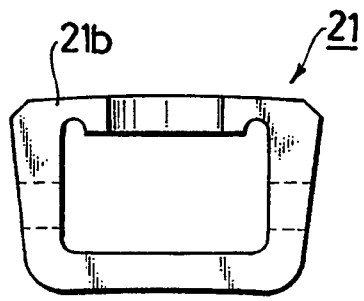
FIG. 8 is a front view of a centering block in a one-way clutch according to a third embodiment of the present invention, in which the centering block has no flange portions.
Figure 9:
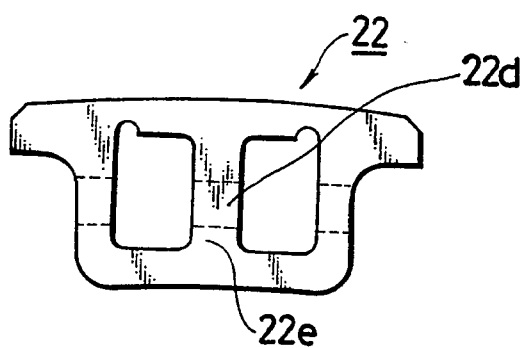
FIG. 9 is a front view of a centering block in a one-way clutch according to a fourth embodiment of the present invention, in which the centering block is provided with a post in a hollow space thereof.
Figure 10:
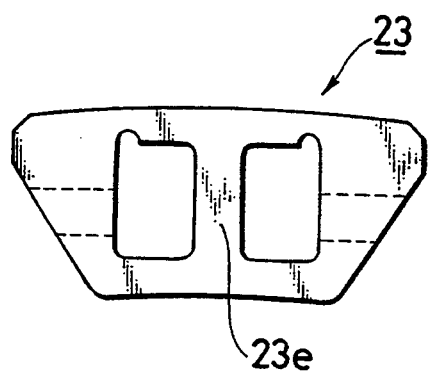
FIG. 10 is a front view of a centering block in a one-way clutch according to a fifth embodiment of the present invention, in which the centering block is also provided with a post in a hollow space thereof.
Figure 11:
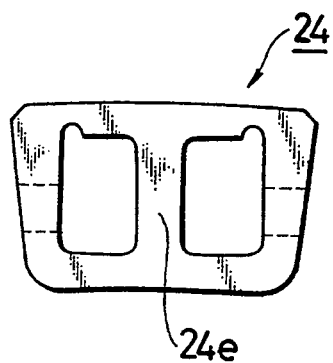
FIG. 11 is a front view of a centering block in a one-way clutch according to a sixth embodiment of the present invention, in which the centering block is also provided with a post in a hollow space thereof.
Figure 12:
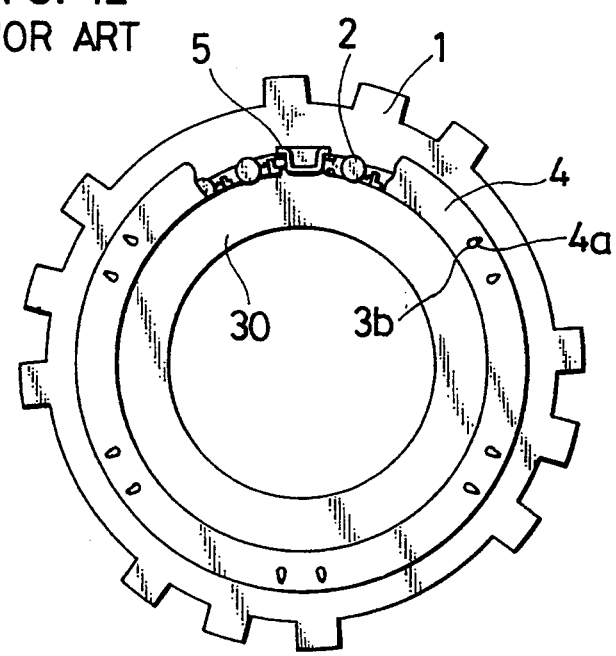
FIG. 12 is a simplified schematic front view of a conventional one-way clutch.
Figure 13:
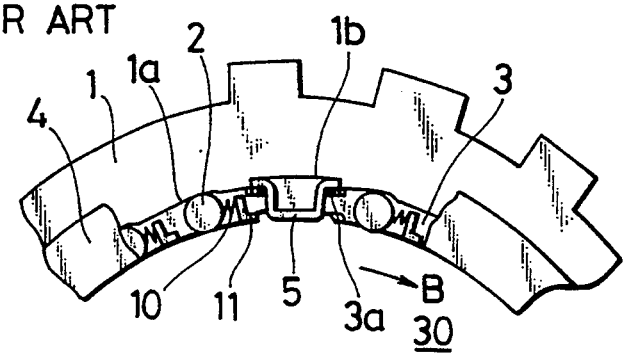
FIG. 13 is an enlarged fragmentary front view of the conventional one-way clutch of FIG. 12.
Figure 14:
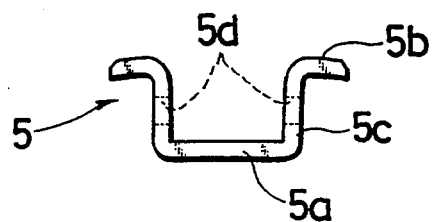
FIG. 14 is a front view of a centering block in the conventional one-way clutch of FIG. 12.
Figure 15:
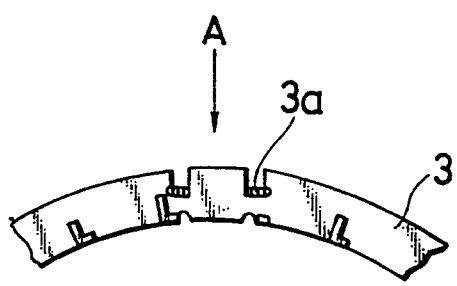
FIG. 15 is a fragmentary front view of a cage in the conventional one-way clutch of FIG. 12.
Figure 16:
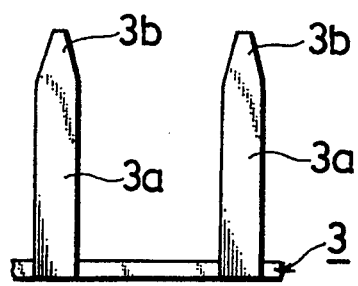
FIG. 16 is a plan view of bent pieces of the cage of FIG. 15 as viewed in the direction of arrow A in FIG. 15.

In the centering block 20 shown in FIG. 7, support portions 20c connecting a sliding portion 20a with a fixed portion 20b are formed thick to provide greater strength. In the centering block 21 depicted in FIG. 8, flange portions have been removed from a fixed portion 21b so that more clutch members can be inserted to provide a greater allowable torque. In the centering blocks 22, 23 and 24 illustrated in FIGS. 9 through 11, respectively, posts 22e, 23e and 24e are provided as support means to provide greater strength. The post 22e is provided with a lubricating oil hole 22d to permit smooth flow of a lubricating oil therethrough. The posts 23e and 24e can also be provided with such a lubricating oil hole as needed.

As has been described above, the centering blocks in each one-way clutch according to this invention have greater strength against radial loads so that the one-way clutch has been improved in resistance to vibrations, especially to vibrations applied via the inner member.

Further, use of the centering blocks makes it possible to increase the width of the bent pieces of the cage and hence to provide their root portions with greater strength. The bent pieces are therefore resistant to deformation even when an abnormally large force is exerted onto the L-shaped spring brackets, so that the bent pieces can firmly support the corresponding centering blocks.

What is claimed is:

1. In a one-way clutch constructed of an inner member, an outer ring disposed coaxially with the inner member, clutch members arranged between the inner member and the outer ring to permit rotation of one of the inner member and the outer ring in one direction relative to the other but to restrict rotation of said one of the inner member and the outer ring in an opposite direction relative to the other, centering blocks arranged between the inner member and the outer ring, and a cage having support elements for the respective centering blocks, the improvement wherein each of said centering blocks is in the form of a hollow body which has four sides, is enclosed on all four sides, and is connected on all four sides to have a closed loop structure, so that the centering block can exhibit improved strength against compression, said hollow body having a sliding portion, which is maintained in sliding contact with one of the inner member and the outer ring, and a fixed portion which is secured on the other one of the inner member and the outer ring, wherein each support element of the cage extends through a hollow space of the corresponding centering block to support the centering block thereon.

2. A one-way clutch of claim 1, wherein the support element is a bent piece which has been formed by bending a part of the cage and extends over the entire inner width of the hollow space of the centering block.

3. A one-way clutch of claim 1, wherein each centering block defines at least one through-hole which communicates an internal space of the hollow body with an outside.

4. A one-way clutch of claim 1, wherein each centering block is made of a sintered alloy.

5. A one-way clutch of claim 1, wherein the fixed portion and the sliding portion of each centering block are connected together with support portions and the thickness of each of the support portions becomes greater toward the fixed portion.

6. A one-way clutch of claim 1, wherein each centering block has flange portions at the fixed portion thereof to facilitate the securement of the fixed portion.

7. A one-way clutch of claim 1, wherein each centering block has support means which extends through an internal space of the hollow body and connects the fixed portion and the sliding portion together.

8. A one-way clutch constructed of an inner member, an outer ring disposed coaxially with the inner member, clutch members arranged between the inner member and the outer ring to permit rotation of one of the inner member and the outer ring in one direction relative to the other but to restrict rotation of said one of the inner member and the outer ring in an opposite direction relative to the other, centering blocks arranged between the inner member and the outer ring, and a cage having support elements for the respective centering blocks, each of said centering blocks being in the form of a hollow body having a sliding portion, which is maintained in sliding contact with one of the inner member and the outer ring, and a fixed portion which is secured on the other one of the member and the outer ring, wherein each centering block has support means which extends through an internal space of the hollow body and connects the fixed portion and the sliding portion together, wherein said support means defines a through-hole which communicates adjacent internal spaces with each other.

* * * * *